Patented Apr. 13, 1954

2,675,301

UNITED STATES PATENT OFFICE 2,675,301

PRODUCTION OF HYDRAZINE

Herbert J. Passino, Englewood, N. J., assignor to The M. W. Kellogg Company, Jersey City, N. J., a corporation of Delaware No Drawing. Application October 23, 1950, Serial No. 191,735

13 Claims. (Cl. 23—190)

This invention relates to the production of hydrazine. In one aspect, the invention relates to a method for the conversion of urea to hydrazine. This application is a continuation-in-part of my prior and co-pending application Serial No. 733,994, filed March 11, 1947, now abandoned, relating to the production of hydrazine.

Hydrazine hydrate has heretofore been manufactured by reacting hypochlorite solution with ammonia, the hypochlorite solution being prepared from sodium hydroxide and chlorine. The reactants for the preparation of hydrazine hydrate by this method are, therefore, 2 molecules of ammonia, 1 molecule of chlorine and 2 molecules of sodium hydroxide for each molecule of hydrazine hydrate produced. It has been found that this method has the disadvantage that the relatively expensive reactants, namely, sodium hydroxide and chlorine, constitute only intermediates in the process and are represented in the resulting products as relatively worthless sodium chloride and water. Aside from the material loss which these products represent, their presence in the reaction product is a positive disadvantage since they must be ultimately separated from the hydrazine hydrate product produced.

It is an object of this invention to provide an improved method for the production of hydrazine.

Another object of the invention is to provide an improved method for the production of hydrazine which requires no expensive reagents that are largely recovered in any form other than hydrazine or hydrazine hydrate.

A further object of the invention is to provide a process for the production of hydrazine in which the recovery of the product constitutes a relatively simple operation.

A still further object of the invention is to provide a process for the production of hydrazine at a unit cost substantially lower than the prior process referred to above.

Other objects and advantages inherent in the invention will become apparent from the following description.

In accordance with the improved process of the present invention, hydrazine is produced by contacting urea under suitable conditions with a carbonyl-forming metal such as nickel, iron, cobalt, ruthenium, molybdenum, chromium and tungsten. Of these carbonyl-forming metals, nickel is preferred for carrying out the process of the invention when employing a relatively low temperature, as more fully hereinafter described, while iron is preferred when carrying out the process of the invention at relatively higher temperatures.

The reaction is carried out by contacting urea under proper reaction conditions with the carbonyl-forming metal which is present in an amount effective to convert a substantial proportion of the urea present to hydrazine and to form a metal carbonyl. The carbonyl-forming metal is present in an amount equivalent to at least 2 weight per cent of the urea present in the reaction zone. It is found that at least such quantity of the carbonyl-forming metal must be used to produce readily isolatable amounts of hydrazine. However, it is preferred that the carbonyl forming metal be present in an amount of at least 10 weight per cent of the urea present in the reaction zone, while an amount of the metal equivalent to at least 50 weight per cent of the urea present in the reaction zone has been found to be most effective in carrying out the hydrazine producing reaction.

The above reaction is preferably carried out by contacting urea with the carbonyl-forming metal at temperatures between about 40° C. and temperatures just below the temperature of decomposition of urea. The decomposition of urea takes place between about 132° C. and about 150° C. It is within the scope of the invention to carry out the reaction at temperatures at which decomposition of urea takes place, or at temperatures above the temperature of decomposition of urea; however, from a standpoint of economics, such temperatures are not preferred.

In accordance with one modification of the invention, the urea is contacted while in a molten condition with the carbonyl-forming metal, such as nickel or iron. In accordance with this modification, it is preferred to operate above 132° C. and just below the temperature of substantial decomposition of the urea. The molten urea is flowed through a granular mass of the nickel or iron at atmospheric pressure. The heat of reaction is supplied, primarily, by the molten urea, but additional heat is supplied by indirect heat exchange, if necessary, to maintain the catalyst mass at the desired temperature. Under these conditions, the hydrazine product is formed as a gas and passes out of the reaction zone with carbon monoxide. If nickel is employed, very little nickel carbonyl is found in the reaction mixture and the hydrazine product is recovered by cooling at about 100° C. to separate it from the carbon monoxide. If iron is employed, some carbonyls may be formed but these are readily decomposed to carbon monoxide and iron. Some iron penta-carbonyl may be formed which may react with hydrazine and other reactants present to form a complex which decomposes to semicarbazide and iron tetra-carbonyl. These compounds are readily separated from hydrazine at temperatures above 113° C. The formation of the semicarbazide represents a comsumption of, at most, one-fifth of the available urea. This cannot be considered as a loss, however, since semicarbazide is a valuable product.

In the above described modification, the iron or nickel carbonyl-forming metal functions as a true catalyst in that no stable metal compounds are formed, the principal products being hydrazine and carbon monoxide. If any metal-carbonyl is formed, it is rapidly decomposed at the relatively high reaction temperature. Under these conditions, the formation of semicarbazide or hydrazine dicarbonamide is minimized. When employing iron as the carbonyl-forming metal, a relatively high temperature, as indicated above, is necessary to maintain this condition. Such temperatures are also effective for the use of nickel as the carbonyl-forming metal. It should be noted, however, that temperatures below the melting point of urea may be effectively employed with nickel. This condition may be maintained with nickel at temperatures between about 60° C. and about 70° C. or higher.

In accordance with another modification of the invention, the contact of urea with the carbonyl-forming metal is effected at temperatures below the melting point of urea and at which the metal carbonyl is relatively stable. Under these conditions, nickel is preferably employed as the carbonyl-forming metal and temperatures within the range of about 40° C. to about 60° C. are utilized. It is preferred to employ a substantial excess of the nickel. Contact may be effected by intimately mixing nickel powder with powdered urea. The nickel having been previously heated to a temperature sufficiently high to heat the urea to the desired temperature and supply the heat of reaction. Liquid hydrazine is formed by this operation, while nickel carbonyl is produced as a gaseous reaction product. The term "hydrazine" is employed throughout this specification for the sake of convenience, but is intended, unless otherwise indicated, to include not only anhydrous hydrazine itself, which is produced for the most part in accordance with the present process, but also hydrazine hydrate as well.

The above reaction may be represented, in general, by the following equation in which nickel is employed as a representative carbonyl-forming metal:

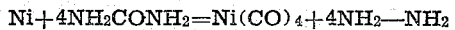
$$Ni + 4NH_2CONH_2 = Ni(CO)_4 + 4NH_2-NH_2$$

The thus formed carbonyl is then decomposed to carbon monoxide and the metal, which may be represented by the following equation:

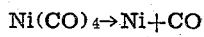
$$Ni(CO)_4 \rightarrow Ni + CO$$

The procedure for the recovery of the hydrazine product will depend upon the reaction conditions employed. When the reaction zone is maintained at a temperature above the melting point of urea, gaseous hydrazine and carbon monoxide are the principal effluents. Some semicarbazide and iron tetra-carbonyl may be formed, but these are readily separated by cooling the effluents to temperatures at which the hydrazine remains in the vapor form. The mixture of hydrazine and carbon monoxide is then fractionated in a suitably packed fractionating tower to yield a hydrazine product essentially free from metal carbonyls.

In instances where the reaction temperature is below the melting point of urea but above the boiling point of hydrazine, the principal gaseous effluent is gaseous hydrazine, although some carbon monoxide may be present and some iron carbonyl may remain with unconverted solid urea. The effluent vapors are freed from iron carbonyl by being heated to temperatures between about 140° C. and about 150° C.

When reaction temperatures below the boiling point of hydrazine are employed, the gaseous effluent is essentially carbon monoxide. This gaseous effluent may also include metal carbonyl vapors, depending upon the particular metal employed and upon the reaction temperature. When nickel is employed at a relatively low temperature, nickel carbonyl vapors may be present in the effluent gas in greater quantity than carbon monoxide. The liquid hydrazine product and accompanying unreacted urea is removed from the reaction zone and maintained at a temperature between about 60° C. and about 80° C. for approximately 10 to 60 minutes to decompose nickel carbonyl. The product is then separated from any nickel which has settled out and is then distilled, preferably by flash distillation, to remove hydrazine as rapidly as possible from unreacted urea. Unreacted urea and recovered nickel catalyst may then be recycled to the operation. It will be understood that when the gaseous effluent comprises largely nickel carbonyl, this material is separately heated to a temperature above the decomposition temperature of nickel carbonyl to recover nickel for reuse as a catalyst.

Preferably the reaction is carried out at low pressure, for example, atmospheric pressure or slightly higher pressure, as high pressure apparently causes the hydrazine product to react with urea with resulting loss of hydrazine.

Having thus described my invention, I claim:

1. A method for producing hydrazine which comprises: flowing molten urea through a granular mass comprising a carbonyl-forming metal in a reaction zone, said carbonyl-forming metal being continuously maintained in an amount equivalent to at least 2 per cent by weight of the quantity of urea present in said reaction zone, at a temperature between about 132° C. and below the temperature of substantial decomposition of urea to convert at least a substantial quantity of urea present to hydrazine; and recovering hydrazine as a product of the process.

2. The process of claim 1 in which the carbonyl forming metal is iron.

3. The process of claim 1 in which the carbonyl-forming metal is nickel.

4. The process of claim 1 in which the carbonyl-forming metal is cobalt.

5. The process of claim 1 in which the carbonyl-forming metal is molybdenum.

6. The process of claim 1 in which the carbonyl-forming metal is tungsten.

7. A method for producing hydrazine which comprises: flowing molten urea through a granular mass comprising a carbonyl-forming metal in a reaction zone, said carbonyl-forming metal being continuously maintained in an amount equivalent to at least 10 per cent by weight of the quantity of urea present in said reaction zone, at a temperature between about 132° C. and below the temperature of substantial decomposition of urea to convert at least a substantial quantity of urea present to hydrazine; and recovering hydrazine as a product of the process.

8. A method for producing hydrazine which comprises: flowing molten urea through a granular mass comprising a carbonyl-forming metal in a reaction zone, said carbonyl-forming metal being continuously maintained in an amount equivalent to at least 50 per cent by weight of the quantity of urea present in said reaction zone, at a temperature between about 132° C. and below the temperature of substantial decomposition of urea to convert at least a substantial quantity of urea present to hydrazine; and recovering hydrazine as a product of the process.

9. A method for producing hydrazine which comprises: flowing molten urea through a granular mass comprising a carbonyl-forming metal in a reaction zone, said carbonyl-forming metal being continuously maintained in an amount equivalent to at least 50 per cent by weight of the quantity of urea present in said reaction zone, at a temperature between about 132° C. and below the temperature of substantial decomposition of urea to convert at least a substantial quantity of urea present to hydrazine and produce a gaseous effluent comprising hydrazine and carbon monoxide; withdrawing said effluent from said reaction zone; cooling the effluent thus withdrawn; and recovering hydrazine from said cooled effluent.

10. A method for producing hydrazine which comprises: flowing molten urea through a granular mass comprising iron in a reaction zone, said iron being continuously maintained in an amount equivalent to at least 50 per cent by weight of the quantity of urea present in said reaction zone, at a temperature between about 132° C. and below the temperature of substantial decomposition of urea to convert at least a substantial quantity of urea present to hydrazine and produce a gaseous effluent comprising hydrazine and carbon monoxide; withdrawing said effluent from said reaction zone; cooling the effluent thus withdrawn; and recovering hydrazine from said cooled effluent.

11. A method for producing hydrazine which comprises: flowing molten urea through a granular mass comprising nickel in a reaction zone, said nickel being continuously maintained in an amount equivalent to at least 50 per cent by weight of the quantity of urea present in said reaction zone, at a temperature between about 132° C. and below the temperature of substantial decomposition of urea to convert at least a substantial quantity of urea present to hydrazine and produce a gaseous effluent comprising hydrazine and carbon monoxide; withdrawing said effluent from said reaction zone; cooling the effluent thus withdrawn; and recovering hydrazine from said cooled effluent.

12. A method for producing hydrazine which comprises: flowing molten urea through a granular mass comprising a carbonyl-forming metal in a reaction zone, said carbonyl-forming metal being continuously maintained in an amount equivalent to at least 2 per cent by weight of the quantity of urea present in said reaction zone, at a temperature between about 132° C. and below the temperature of substantial decomposition of urea to convert at least a substantial quantity of urea present to hydrazine and produce a gaseous effluent comprising hydrazine and carbon monoxide; withdrawing said effluent from said reaction zone; cooling the effluent thus withdrawn; and recovering hydrazine from said cooled effluent.

13. A method for producing hydrazine which comprises: flowing molten urea through a granular mass comprising a carbonyl-forming metal in a reaction zone, said carbonyl-forming metal being continuously maintained in an amount equivalent to at least 10 per cent by weight of the quantity of urea present in said reaction zone, at a temperature between about 132° C. and below the temperature of substantial decomposition of urea to convert at least a substantial quantity of urea present to hydrazine and produce a gaseous effluent comprising hydrazine and carbon monoxide; withdrawing said effluent from said reaction zone; cooling the effluent thus withdrawn; and recovering hydrazine from said cooled effluent.

References Cited in the file of this patent

UNITED STATES PATENTS

| Number | Name | Date |
| --- | --- | --- |
| 910,858 | Raschig | Jan. 26, 1909 |
| 2,129,689 | Hetherington | Sept. 13, 1938 |
| 2,527,315 | MacKay | Oct. 24, 1950 |

FOREIGN PATENTS

| Number | Country | Date |
| --- | --- | --- |
| 583,504 | Great Britain | Dec. 19, 1946 |

OTHER REFERENCES

"Chemistry of Hydrazine" by Audrieth and Ogg, pages 32–36, 1951 ed., John Wiley and Sons, N. Y.